(12) United States Patent
Gaudette et al.

(10) Patent No.: US 8,819,493 B1
(45) Date of Patent: *Aug. 26, 2014

(54) AUTOMATIC CONFIGURATION OF A TEST ENVIRONMENT

(71) Applicant: The Mathworks, Inc., Natick, MA (US)

(72) Inventors: Thomas Gaudette, Jamaica Plain, MA (US); Michelle T. Hirsh, Westborough, MA (US); Christian A. Portal, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,492

(22) Filed: Dec. 3, 2012

Related U.S. Application Data

(63) Continuation of application No. 11/889,386, filed on Aug. 13, 2007, now Pat. No. 8,433,953.

(51) Int. Cl.
*G06F 11/00* (2006.01)

(52) U.S. Cl.
USPC ............... 714/33; 714/25; 714/38.1; 702/123

(58) Field of Classification Search
USPC .............................. 714/25, 33, 38.1; 702/123
See application file for complete search history.

(56) References Cited

U.S. PATENT DOCUMENTS

| | | | |
|---|---|---|---|
| 6,397,378 B1 | 5/2002 | Grey et al. | |
| 6,622,272 B1 | 9/2003 | Haverkamp et al. | |
| 7,197,416 B2 | 3/2007 | Adachi et al. | |
| 7,356,432 B1 | 4/2008 | Lang | |
| 7,373,621 B1 | 5/2008 | Dastidar | |
| 7,650,594 B2 | 1/2010 | Nattinger | |
| 2003/0097551 A1 | 5/2003 | Fuller et al. | |
| 2005/0039170 A1 | 2/2005 | Cifra et al. | |
| 2007/0006038 A1 | 1/2007 | Zhou | |
| 2007/0220392 A1 | 9/2007 | Bhaumik et al. | |

OTHER PUBLICATIONS http://www.mathworks.com/access/helpdesk/help/toolbox/distcomp, last accessed Aug. 6, 2007.

*Primary Examiner* — Philip Guyton
(74) *Attorney, Agent, or Firm* — Venable LLP; Michael A. Sartori; Todd R. Farnsworth

(57) ABSTRACT

Test configurations are generated based on information regarding hardware or software. A desired test configuration is selected. Test elements are automatically generated based on the desired test configuration, the test elements for testing at least one of the hardware or software. A plurality of test vectors is generated to test the hardware or software for the desired test configuration. The desired test configuration is converted to a script file. At least one of the hardware or software is automatically tested using the script file. Automatically testing the at least one of the hardware or the software includes using a first set of one or more test vectors from the plurality of test vectors to perform a plurality of test iterations of one or more of the actions of one or more generated test elements, and includes using at least a second set of one or more test vectors from the plurality of test vectors to determine the number of test iterations. A result of the testing is produced.

25 Claims, 14 Drawing Sheets

FIG. 3D

AUTOMATIC CONFIGURATION OF A TEST ENVIRONMENT

RELATED APPLICATIONS

This patent application is a continuation of U.S. patent application Ser. No. 11/889,386, filed on Aug. 13, 2007, which is hereby incorporated herein by reference in its entirety.

BACKGROUND

Typically, a test engineer develops a test to test operation of a unit, system or software file under controlled conditions. The test engineer interested in developing test programs often needs to interface with an instrument to test the instrument itself, use the instrument to test a unit under test, or incorporate live measured data from the instrument into a test. Another example of a test is the verification and validation of a system modeled in software. In such a scenario, a system designer often models a physical system or component in software to explore design ideas and parameters. A test may be used to verify different design iterations meet specific design requirements that must be satisfied. To create such a test system, test engineers use different techniques. For example, a test engineer may interact with the instrument directly without using a user interface or without using an additional computer to interface with the instrument. As another example, a test engineer may interact with the instrument directly using a user interface or using an additional computer to interface with the instrument. Such an interaction, however, is manually intensive and requires significant amount of time for a test engineer to write a test program, with no technique to automate the process.

As a further example, a test engineer may use a computing environment to determine how to optimally configure the instrument for a test. This conventionally involves selecting an instrument, ensuring that the computing environment can communicate with the instrument, iterating through various test configurations (e.g., various communication command sequences between the computing environment and the instrument), and determining the desired test configuration to use for the test by verifying the results of the various test configurations, either through visual inspection or by analysis.

Once a desired test configuration has been determined, a test engineer may attempt to incorporate this set up into a test environment. However, this step is not always seamless due to disparate tools being used by the computing environment and the test environment and/or limitations of the computing environment and the test environment. As a result, the test engineer must manually recode or re-implement the desired test configuration in the test environment.

SUMMARY

In one exemplary embodiment, a test for testing at least one of hardware or software may be generated in a first environment. A desired test configuration may be selected based on information regarding respective hardware or software. Test elements may be automatically generated based on the desired test configuration, the test elements adapted to test at least one of the respective hardware or software. At least one of the hardware or software may be automatically tested using a subset of the test elements. A result of the test is produced.

In another exemplary embodiment, a system may generate a test, a computer-implemented test environment may select a desired test configuration based on information regarding at least one of hardware or software, generate automatically test elements based on the desired test configuration, the test elements adapted to test at least one of the hardware or software, automatically test at least one of the hardware or software using a subset of the test elements, and produce a result of the test.

Further features of the invention, as well as the structure and operation of various embodiments of the invention, are described in detail below with reference to the accompanying drawings.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIGS. 3A to 3E illustrate an exemplary graphical user interface for generating an exemplary desired test configuration.

DEFINITIONS

Figure 1:
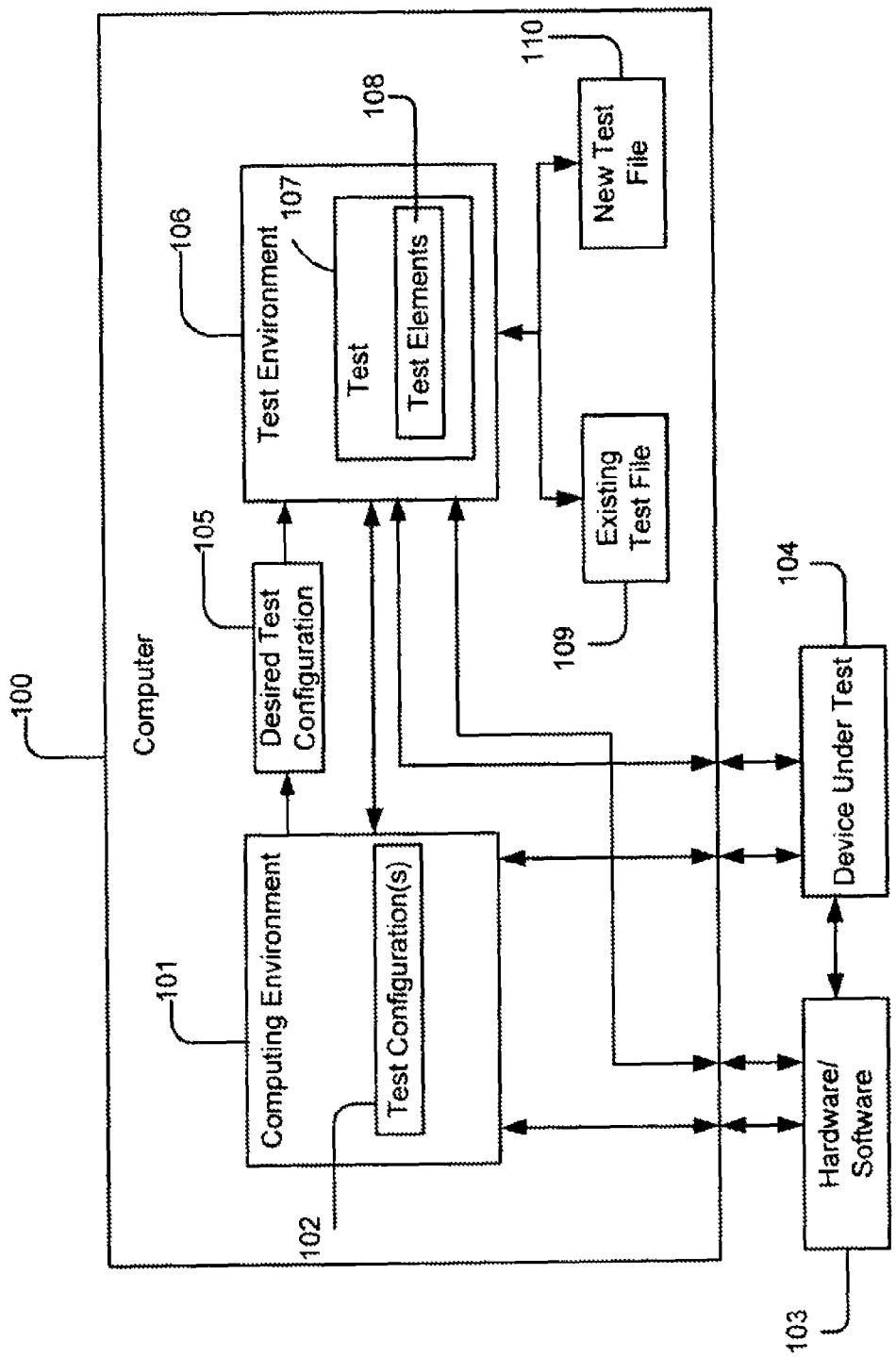
FIG. 1 illustrates an exemplary configuration for an exemplary embodiment of the invention.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 702.x, etc.

A "computing environment" may refer to an environment that allows users to create, analyze, simulate, or test models. A computing environment may be textual and/or graphical. Exemplary embodiments may exist as part of a textual technical computing environment such as MATLAB® by The MathWorks, Inc. of Natick, Mass., MATHEMATICA® by Wolfram Research, or COMSOL® Script by Comsol, Inc. The techniques described herein may be embodied in functional components, such as, for example, in a function, a model, a class, or other program element. Exemplary embodiments may alternatively exist as a part of a technical computing environment that has graphical models, such as SIMULINK® and STATEFLOW® by The MathWorks, Inc. of Natick Mass., or LABVIEW® by National Instruments Corporation. The techniques described herein may be embodied in functional components of such a computing environment, such as, for example, in a simulation block, or in simulation toolset.

DETAILED DESCRIPTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

A technical computing environment may be used to determine a desired test configuration for an instrument. A test environment (e.g., SystemTest by The Mathworks, Inc. of Natick, Mass.) uses the desired test configuration to automatically determine test elements for a test. The desired test configuration may be defined externally from the test environment. The test environment may be used for carrying out one or more tests on the instrument, device or system under test.

Figure 2:
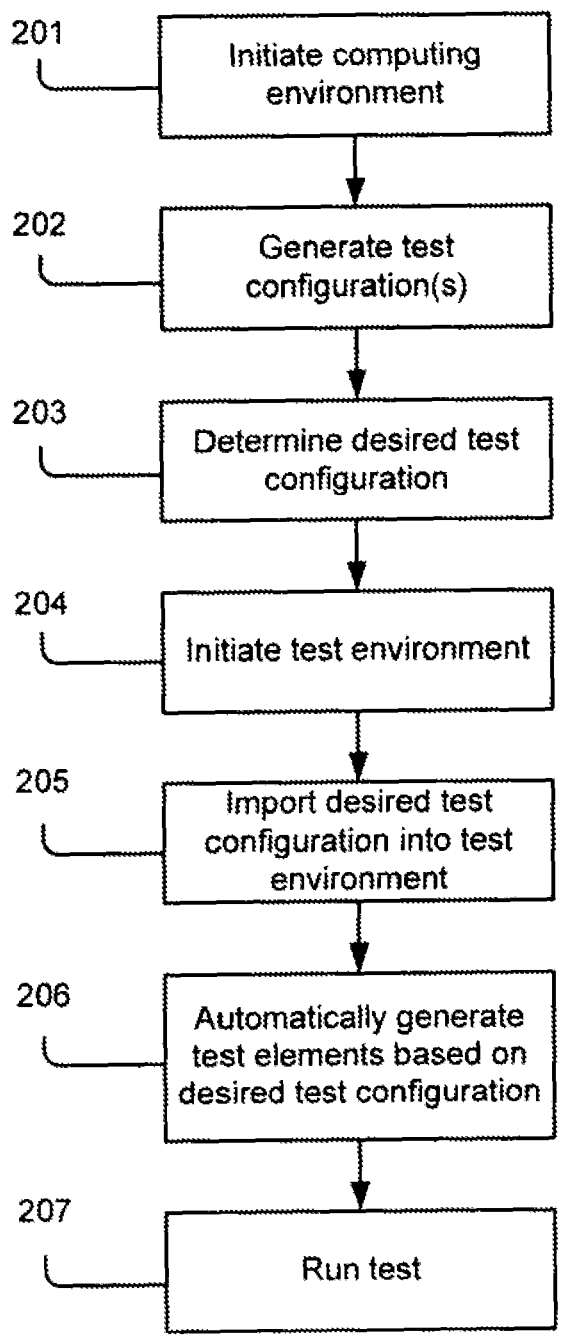
FIG. 2 illustrates a flowchart for configuring a test in an exemplary embodiment of the invention.

FIG. 1 depicts an exemplary configuration for an exemplary embodiment of the invention. FIG. 2 depicts a flowchart for the exemplary configuration for an exemplary embodiment of the invention.

In block 201, a computing environment 101 may be initiated. Such computing environment 101 may be, for example, a technical computing environment. A technical computing environment may refer to a computing environment or system capable of processing or compiling code, for example, the code directed to technical computing applications. As an example, the computing environment 101 may be based on MATLAB® programming environment and the Test & Measurement Tool, provided with the Instrument Control Toolbox, by The MathWorks, Inc. of Natick, Mass.

In block 202, one or more test configurations 102 may be generated using the computing environment 101. A test configuration may be the information needed to setup inputs for a test, measure outputs of the test, and compare the measured outputs with known criteria. A test engineer may interact with the computing environment 101 via a graphical user interface to generate the test configurations 102. The test configurations 102 may be generated for one or more instruments 103. The test configurations 102 may, for example: interface with the instrument 103 to test the instrument 103; use the instrument 103 to test a system or device under test or a simulation model of a system under test 104; or incorporate live measured data from the instrument 103 into a test. The instrument may be hardware or software. Examples of hardware may include: a data acquisition device, an image acquisition device, a smart sensor, an automated test system (ATS), etc. The software may be software to read data from and/or write data to regarding a test. Examples of the software may include: custom code such as C, C++, or Java; a component object model (COM); one or more third-party application program interfaces (API); one or more machine-readable binary libraries; data processing software; signal processing software; curve fitting software; etc. As an example, the instrument 103 may be an oscilloscope, a function generator, a power supply, and/or any other equipment capable of performing testing or being tested or generating data. The system under test 104 may be, for example, a unit test such as a hardware device, a software algorithm, software files, a system model, software coverage testing, software testing with stubs, and the like. The simulation model of the system under test 104 may be textual and/or graphical. In one embodiment, one or more textual portions of the simulation model of the system under test 104 may be written in a matrix-based mathematical programming language. The matrix-based programming language may be a language including at least some operations adapted for processing arrays or matrices of data. For example, the matrix-based programming language may be MATLAB® programming language by The MathWorks, Inc. of Natick, Mass., or a language including a subset of instructions which is executable in the MATLAB® computing environment. Further, the test configurations 102 may be generated for one or more devices under test 104. The test configuration 102 may interface directly with the device under test 104 without using the instrument 103. In an alternative embodiment, the test configuration 102 may interface with a test environment 106, which, in turn, may interface with the device under test 104.

FIGS. 3A to 3E illustrate an exemplary graphical user interface or interfaces 300 for generating an exemplary desired test configuration as performed in blocks 202 and 203. In this example, an exemplary desired test configuration entails communicating with a TDS 210 oscilloscope available from Tektronix of Beaverton, Oreg. via a general purpose interface bus (GPIB) interface such as, for example, a GPIB board by Capital Equipment Corp. of Norton, Mass. or a GPIB board by Keithley Instruments Inc, of Cleveland, Ohio. In the alternative embodiments, similar or different graphical and/or textual user interface may be used to allow a user to enter settings and/or test instructions for the instrument 103 and/or the device under test 104.

Figure 3A:
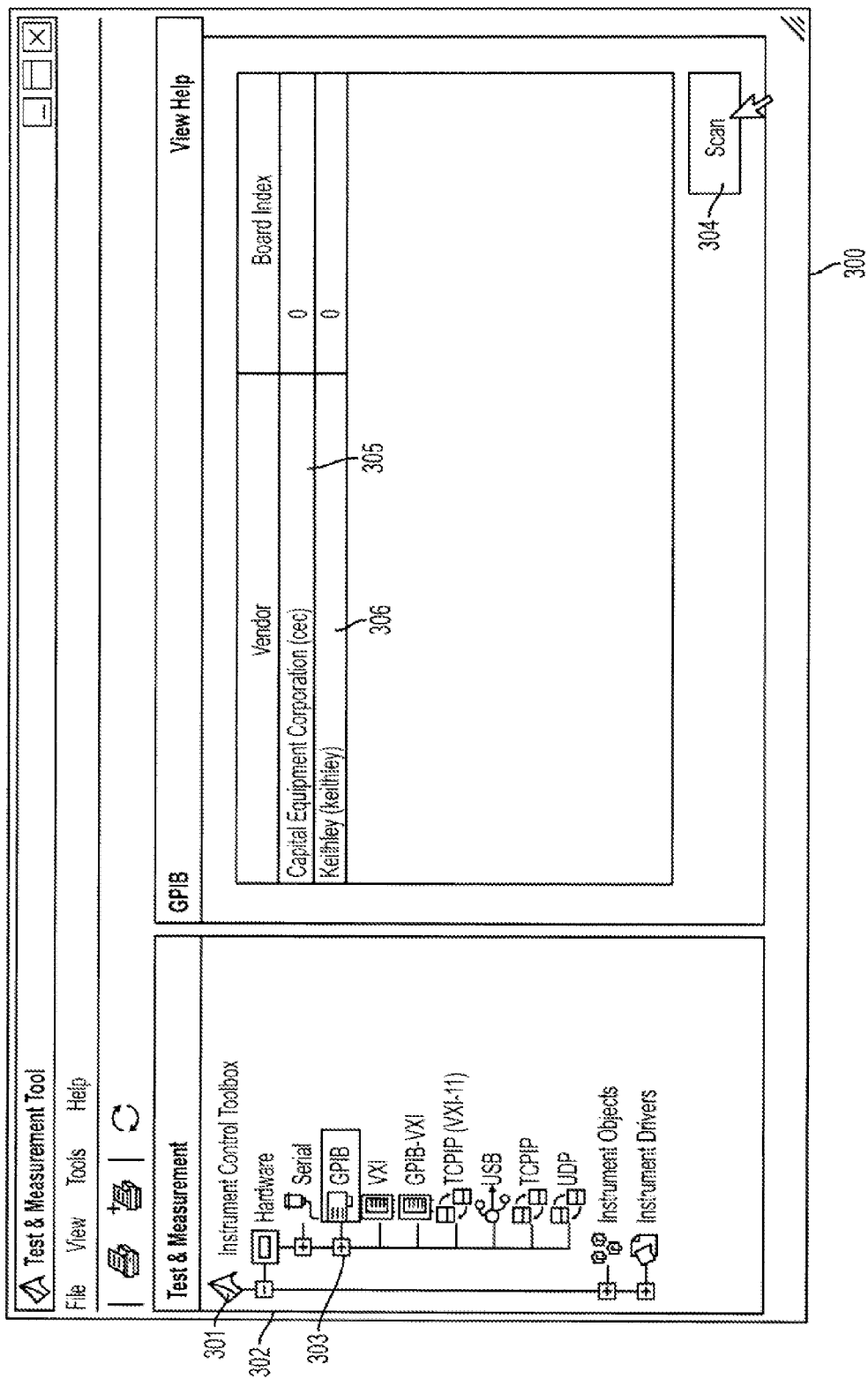

In this example, the GPIB boards connected to the computer may be initially determined. As illustrated in FIG. 3A, the test engineer may expand an instrument control toolbox 301, expand a hardware 302, and select a GPIB 303 from a pull-down list of available boards and/or interfaces. By clicking on a Scan button 304, the computing environment 101 may scan the computer to determine what GPIB boards are installed. For example, a GPIB board 305 by Capital Equipment Corp. of Norton, Mass. and a GPIB board 306 by Keithley Instruments Inc. of Cleveland, Ohio may be installed on the computer of the shown embodiment.

Figure 3B:
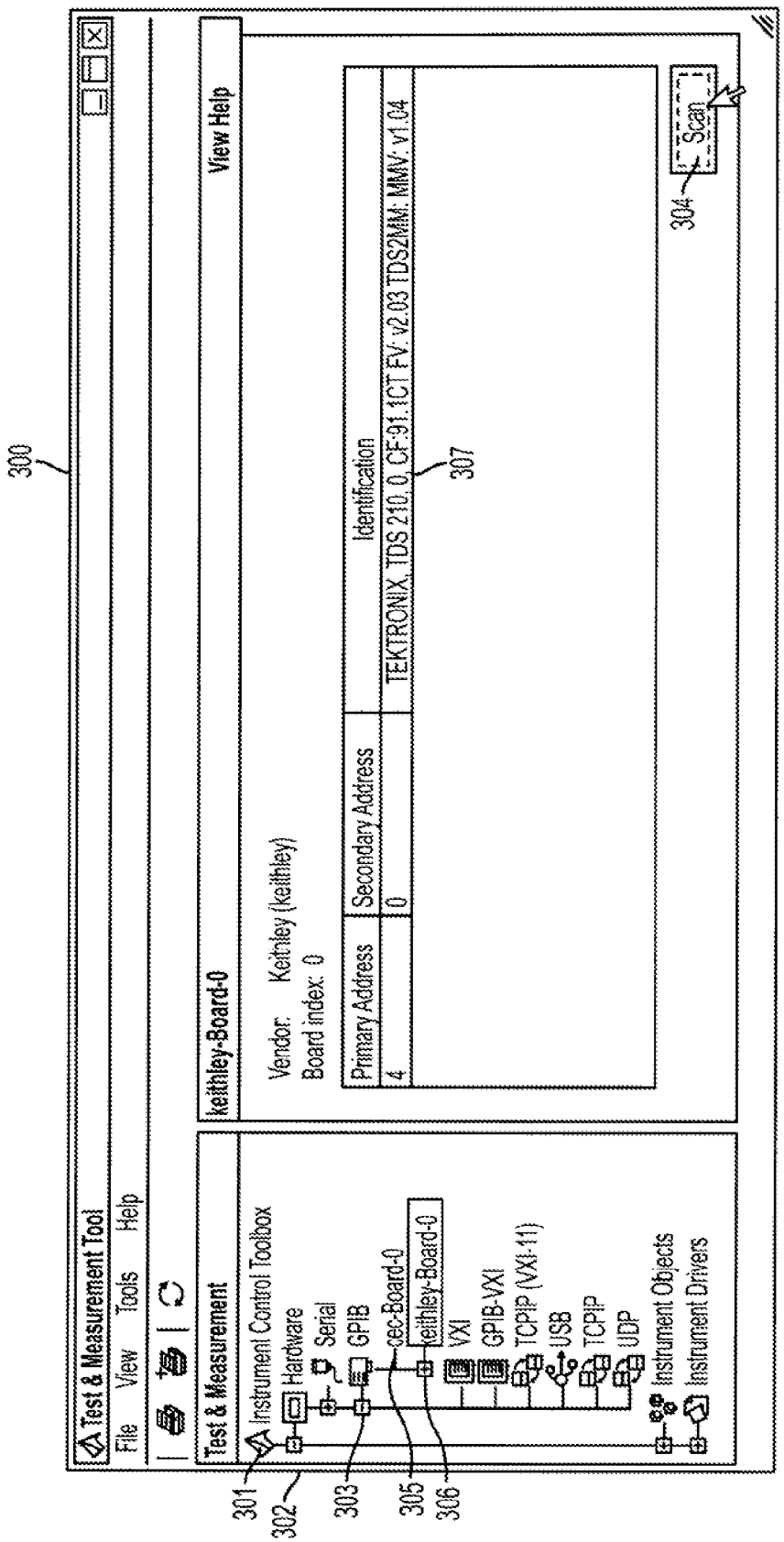

Once the GPIB boards are determined, the instrument connected to a selected GPIB board may be determined. As illustrated in FIG. 3B, the test engineer may expand the GPIB 303, select the Keithley GPIB board 306, and click the Scan button 304 to determine what instruments are connected to the selected Keithley GPIB board 306. For this example, a TDS 210 oscilloscope 307 from Tektronix of Beaverton, Oreg. is connected to the Keithley GPIB board 306.

Figure 3C:
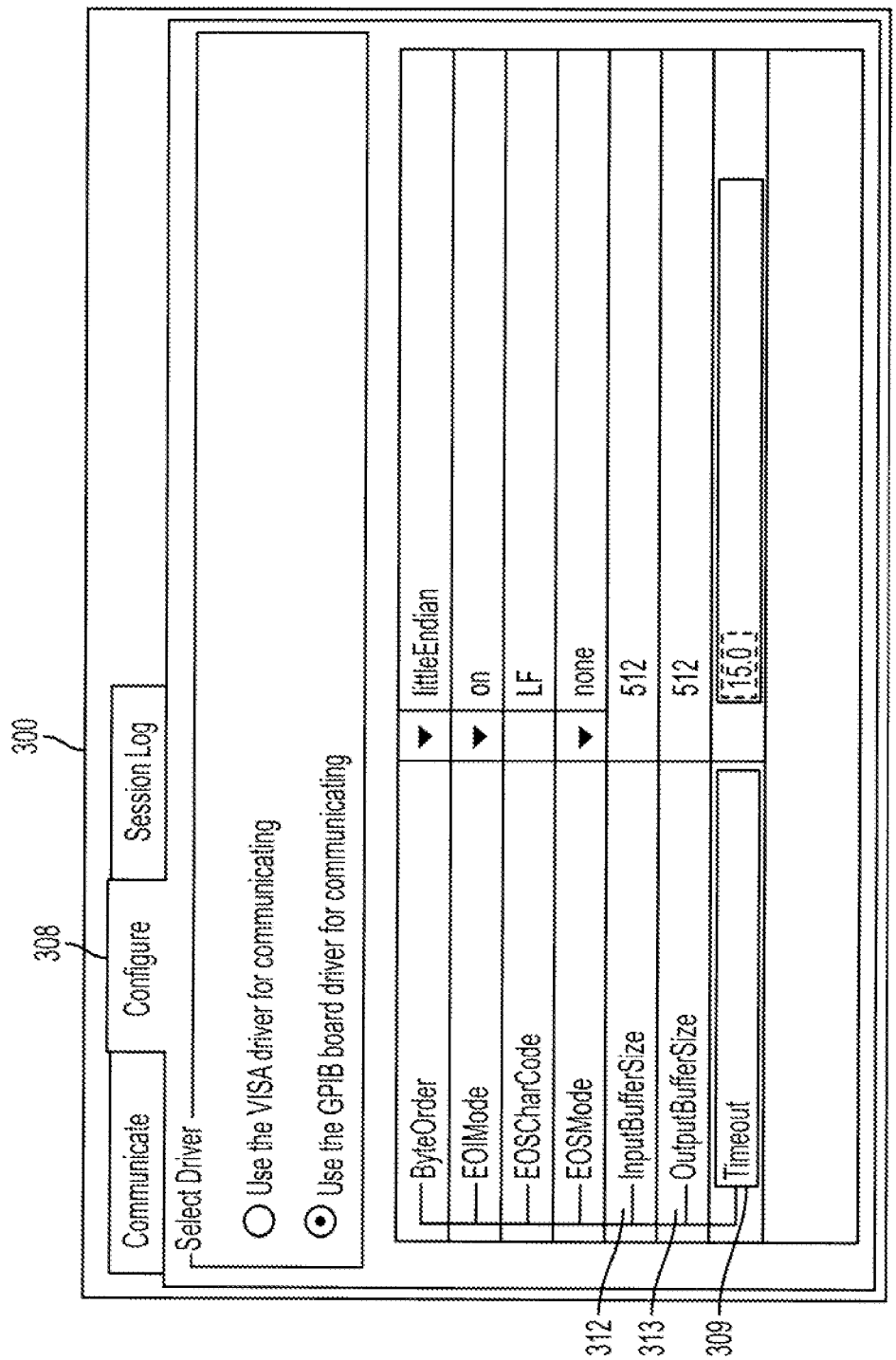

Once the instrument is determined, the instrument connected to the computer may be configured. As illustrated in FIG. 3C, the test engineer may select a Configure tab 308 and may adjust the settings of the TDS 210 oscilloscope. For this example, a value for a Timeout 309 has been set to 15 seconds, a value for an InputBufferSize 312 has been set to 512 bytes, and a value for an OutputBufferSize 313 has been set to 512 bytes.

Figure 3D:
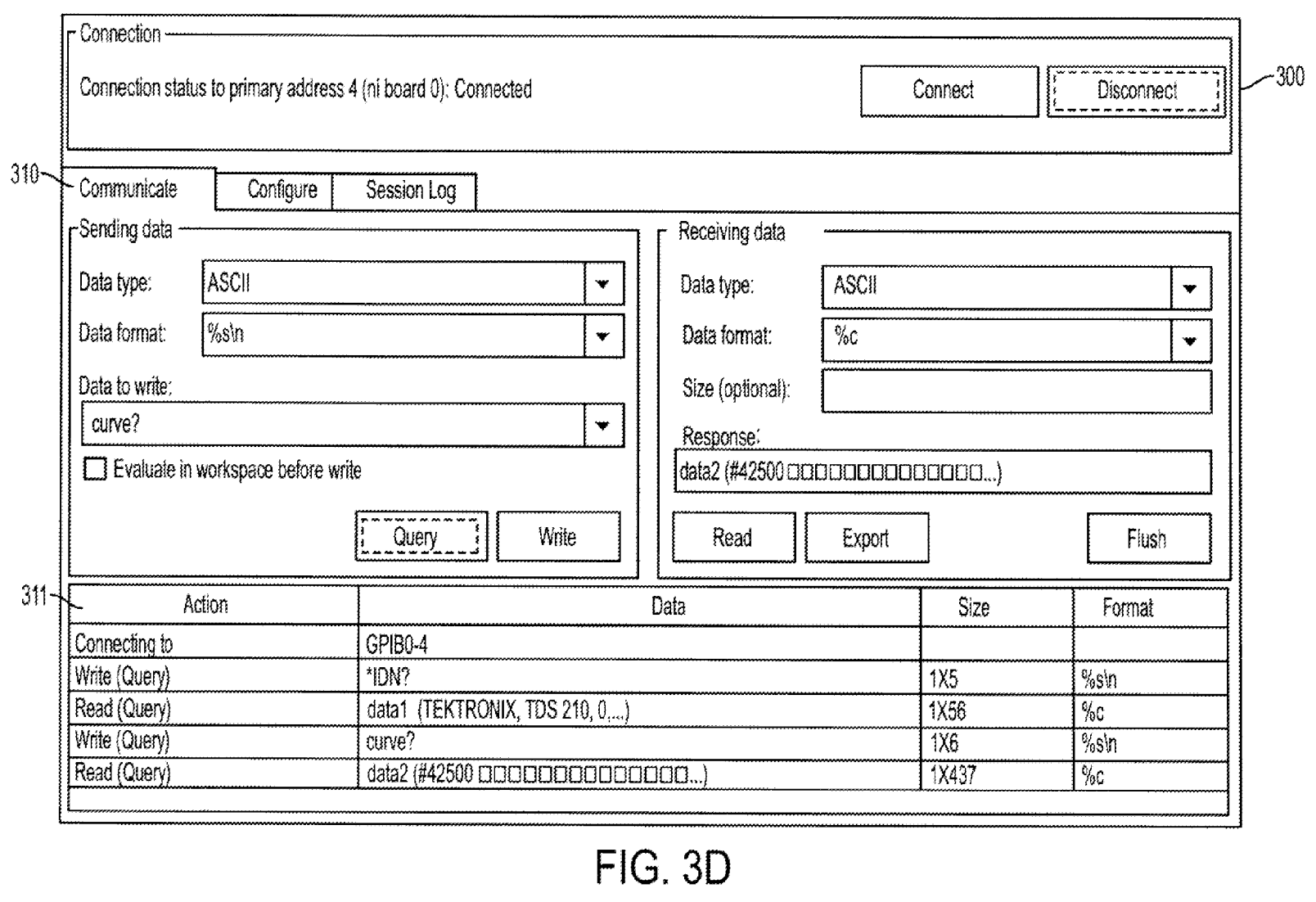

Once the instrument is configured, a communication sequence for reading data from the instrument and writing data to the instrument may be generated. A communication sequence may be a code that performs the instrument selection, establishes a connection, and applies the desired configuration. At the request of the test engineer, a communication channel may be established with the instrument, and an interface object representing the communication channel to the instrument may be created. As illustrated in FIG. 3D, the test engineer may select a Communicate tab 310 and provide instructions 311 to read from and write to the TDS 210 oscilloscope. In addition, data acquired from the instrument may be exported as, for example, a variable in a workspace, an array in a workspace, a plot in a separate window, an argument for use in an instrument control command, or a file for storage.

A test engineer may generate various test configurations for interfacing with the instrument 103 to determine the desired test configuration 105. Continuing the above example, referring to FIG. 3C, the test engineer may adjust settings of the TDS 210 oscilloscope to different values. For example, the Timeout value 309 may be set to 20 seconds, the InputBufferSize value 312 may be set to 1024 bytes, and the OutputBufferSize value 313 may be set to 1024 bytes. Further, referring to FIG. 3D, additional or alternative commands for interacting with the instrument 103 may be executed. It is contemplated that the test instrument may communicate to more than one test environment.

In block 203, a desired test configuration may be determined from the test configuration(s) determined in block 202. The test engineer or the computing environment 101 may determine the desired test configuration 105. If the computing environment 101 determines the desired test configuration 105, the computing environment 101 may determine the desired test configuration 105 based on, for example, an optimization criterion. The desired test configuration may be a dynamically-created software program (e.g., a MATLAB® script code or MATLAB® program). The program may be saved to a file, which may be imported to the test environment 106 in block 205, or it may be sent directly to the test environment 106, without being saved to a file. As an alternative, the computing environment 101 may generate a machine readable software library that encapsulates the desired test configuration. Such library may be, for example, a compiled binary library or any other machine-readable component. The binary library may be imported and invoked by the test environment 106. Continuing the above example, the desired test configuration for the TDS 210 oscilloscope may be converted to a script file and saved on the computer. A script file may be, for example, a file written in an array-based language and/or dynamically typed language. An array based language is a language having commands particularly adapted to operations on matrices or vectors. An example of an array based language may be a language at least a subset of commands of which are executable in the MATLAB® computing environment. In an alternative embodiment, a script file may be in any other programming language, such as, for example, C, C++, or other custom or industry-wide programming or scripting languages.

Figure 3E:
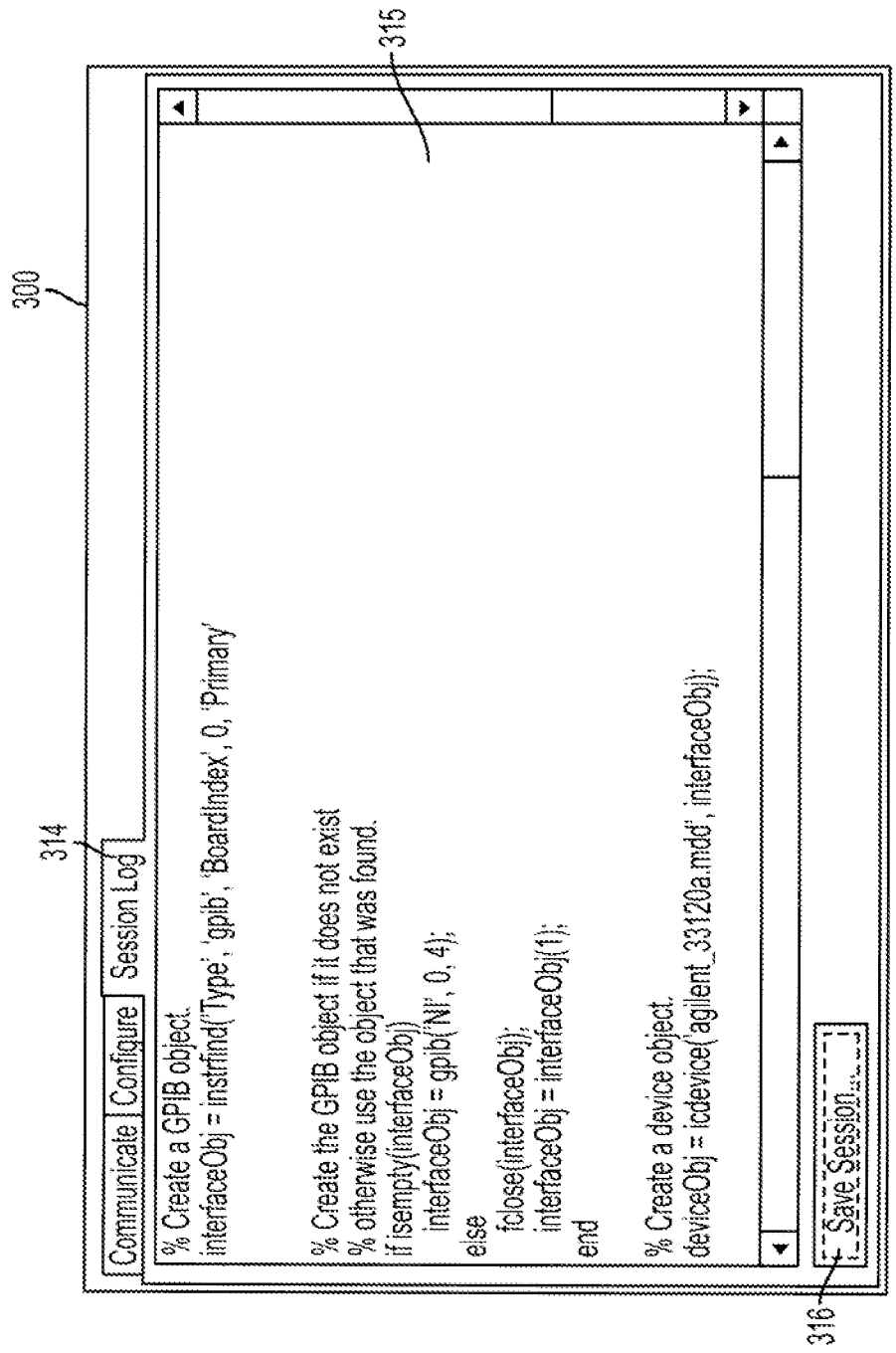

Referring to FIG. 3E, the Session Log tab 314 may be selected, and a script file 315 may be automatically generated as the desired test configuration, and saved by a selection 316 by the test engineer.

In block 204, the test environment 106 may be initiated. The test environment 106 may refer to a framework that integrates software, hardware, simulation, or other types of testing to develop a test, run the test, and save results from the test.

Figure 4:
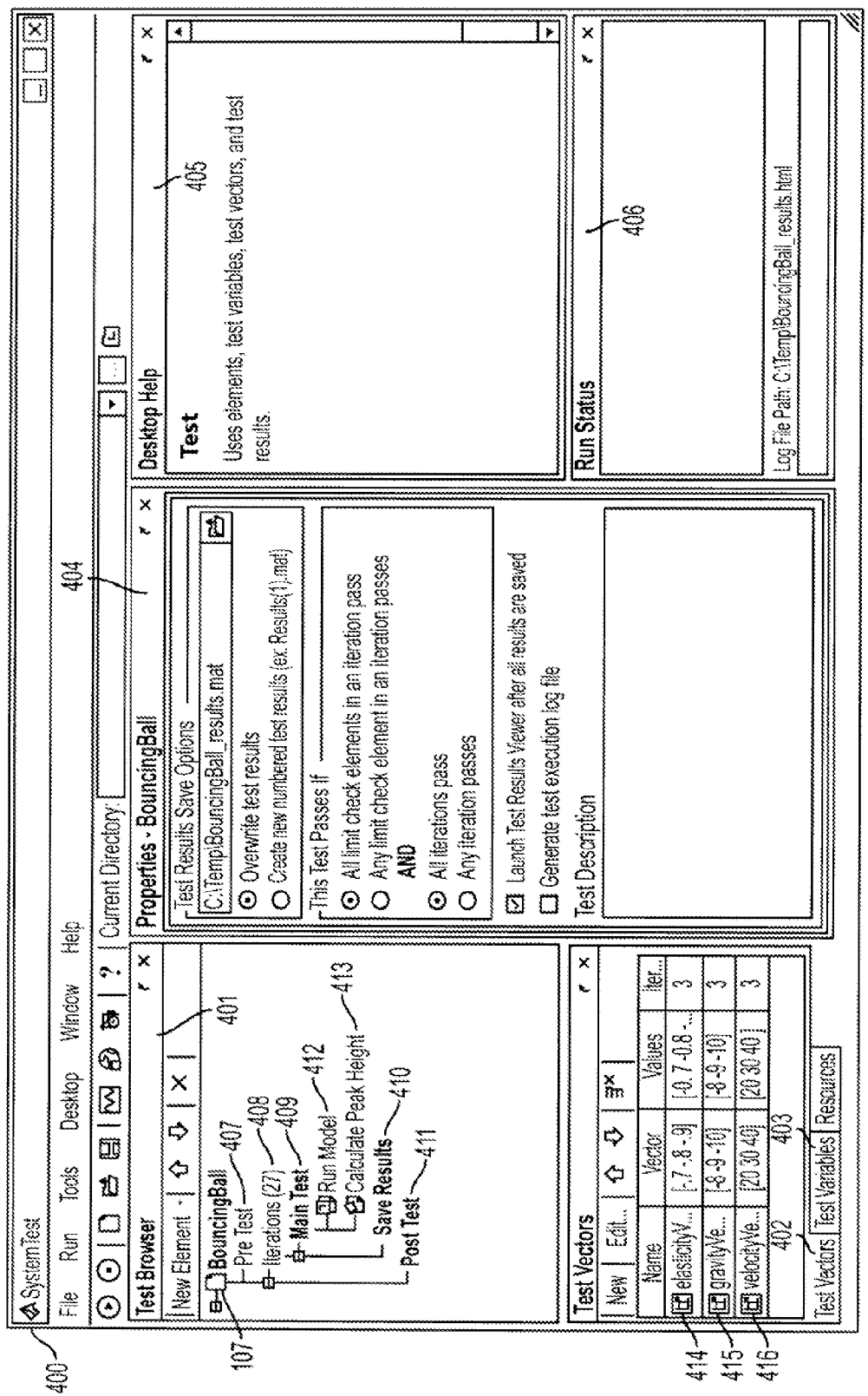
FIG. 4 illustrates an exemplary graphical user interface for an exemplary test environment.

FIG. 4 illustrates an exemplary graphical user interface 400 for an exemplary test environment 106. The test environment 106 may include a graphical user interface having a test browser 401, a test vectors pane 402, a test variables pane 403, a properties pane 404, a help pane 405, and a run status pane 406.

In the test browser 401, a test 107 may be generated. In the exemplary embodiment of FIG. 4, the test 107 is labeled "BouncingBall." A test may include, for example, a pre test section 407, an iterations part 408, a main test section 409, a save results part 410, and a post test section 411. The test browser 401 may be used to add or delete test elements 108 to the various sections of the test, as for example, the pre test section 407, the main test section 409, or the post test section 411. The test elements 108 may determine actions for the test 107 to perform, such as, for example, to evaluate a script file written for a script language or simulate a model of a graphical or modeling environment. As an example, the test elements 108 may include: connecting to the instrument 103; collecting data from the instrument 103; comparing the collected data to known criteria; disconnecting from the instrument 103. As a further example, the test elements 108 automatically generated from a desired test configuration may include: initiating test software; collecting data from the test software; comparing the collected data to known criteria; and closing the test software. Another example may be a single test element that is automatically generated to encapsulate the desired test configuration. In the exemplary embodiment of FIG. 4, the main test section 409 includes a "Run Model" test element 412 and a "Calculate Peak Hight" test element 413. It is contemplated that the test elements may be added to various sections of the test 107 by the test environment 106.

The test vectors may specify the values that vary during each test iteration. The test vectors values may be specified by the user via the test vectors pane 402 and include arguments for algorithms or parameters and input signals for models. Test vectors may be displayed during test execution. A "test vector" may be a set of one or more values for one or more parameters in the model under test. Test vectors may be combined to generate a number of possible iterations through the test. Here, for example, three test vectors 414, 415, and 416 are displayed. In this example, each test vector has three sample points, and, thus, there are 27 iterations 408 through the test vectors, e.g., the total number of possible combinations is 3×3×3=27. In an alternative embodiment, not all possible combinations may be tested. For example, a user may specify which combinations of test vectors to test, which ones are related and may be executed as a group, or the test environment 106 or the computing environment 101 may determine a number and particularities of various test scenarios based on the test vectors. Some approaches to determining test iterations may include, for example: randomized sampling, sampling based on inter-relationships between the vectors, sampling based on previous test runs, etc. In yet another embodiment of the invention, different approaches may be used to determining the number of iterations through different test patterns, as deemed appropriate by one of skill in the art.

Test variables may be used to temporarily store data for use by the test elements 108 during test execution. The variables may be initialized in the pre-test section 408 or the main test section 409 via the test variables pane 403. Alternatively, the test variables may be automatically initialized or defined as appropriate for the particular test environment.

The properties pane 404 may show the properties of the test or the test element that is being edited. The contents of the properties pane 404 may change when a test engineer selects a section or element in the test.

The help pane 405 may show help topics regarding the test element or aspect of the test that is currently selected.

The run status pane 406 may show a summary of the execution status of the test.

As mentioned above, in block 205, the desired test configuration 105 may be imported into the test environment 106 for an associated test 107. In one embodiment, the test engineer may identify the test 107 for which the desired test configuration 105 is to be imported. The test engineer may alternatively identify the desired test configuration 105. The test environment 106 may then obtain the identified desired test configuration 105 for the test 107.

Continuing the above example, the test engineer may identify the file including at least a part of the desired test configuration for the TDS 210 oscilloscope.

Figure 5:
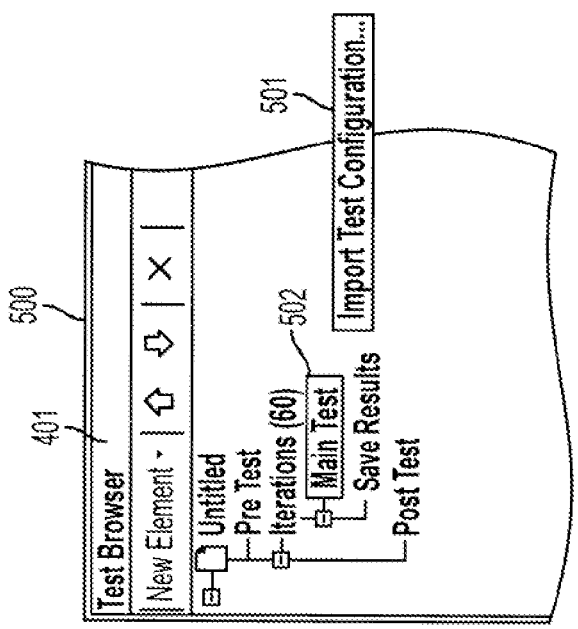
FIG. 5 illustrates an exemplary graphical user interface for importing a desired test configuration into a test environment.

FIG. 5 illustrates an exemplary graphical user interface 500 for importing a desired test configuration into a test environment. As illustrated in FIG. 5, the test engineer may invoke a right click menu option with a mouse that lists Import Test Configuration 501 and locate the file for the desired test configuration for the TDS 210 oscilloscope. As an alternative, the test engineer may click Main Test 502 in the test browser 401, select Import Test Configuration 501 in the drop down menu, and locate the file for the desired test configuration for the TDS 210 oscilloscope. Other selection options may be made available to the test engineer.

In block 206, one or more test elements 108 corresponding to the desired test configuration 105 may be automatically generated by the test environment 106. The test environment 106 may automatically generate the two or more test elements 108 corresponding to the desired test configuration 105. The test elements 108 may be created and configured without further input or intervention on the part of the test engineer. For example, MATLAB® test elements may be automatically generated for a MATLAB® desired test configuration. Continuing the above example, after the identification of the desired configuration file by the test engineer, the test environment 106 may automatically generate test elements 108 for the test 107 corresponding to the desired test configuration 105 for the TDS 210 oscilloscope. The test elements 108 may interface with one or more instruments 103 and/or with one or more devices under test 104 without using any instrument 103.

As a part of generating the test elements 108, the test environment 106 may insert the test elements 108 into the test 107. The test 107 may be saved as an existing test file 109 or a new test file 110.

Figure 6:
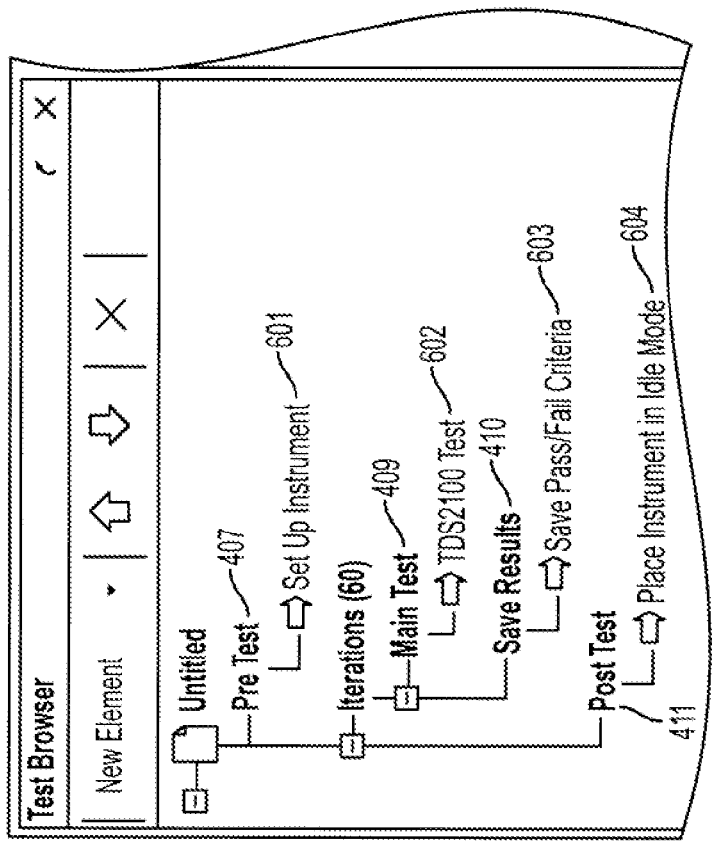
FIG. 6 illustrates an exemplary graphical user interface for a desired test configuration imported into a test environment.

FIG. 6 illustrates an exemplary graphical user interface for a desired test configuration imported into a test environment. Continuing the above example, as illustrated in FIG. 6, the test environment 106 may automatically generate the following test elements: "Set Up Instrument" test element 601; "TDS210 Test" test element 602; "Save Pass/Fail Criteria" test element 603; and "Place Instrument in Idle Mode" test element 604. The "Set Up Instrument" test element 601 may be inserted into the pre test section 407. The "TDS210 Test" test element 602 may be inserted into the main test section 409; the "Save Pass/Fail Criteria" test element 603 may be inserted into the save results section 410; and the "Place Instrument in Idle Mode" test element 604 may be inserted into the post test section 411. Each test element may be identified with a particular icon and a reference. The particular icon may represent the type of test element (e.g., a MATLAB® environment test element).

In block 207, after the test elements 108 have been created or inserted in the test 107, the test environment 106 may run the test 107. When the test element 108 corresponding to the desired test configuration 105 is run, the instrument 103 may be accessed according to the desired test configuration 105.

The computing environment 101 and the test environment 106 may reside on the same computer 100. As illustrated in FIG. 1, one or more instruments 103 may be external to the computer 100 executing the computing environment 101. As an alternative exemplary embodiment of the invention, one or more instruments 103 may be internal to the computer 100 executing the computing environment 101. As illustrated in FIG. 1, one or more devices under test 104 may be external to the computer 100 executing the computing environment 101. As an alternative exemplary embodiment of the invention, one or more devices under test 104 may be internal to the computer 100 executing the computing environment 101.

In the above exemplary embodiment of the invention, the interactions between a test engineer and the computing environment 101 and between a test engineer and the test environment 106 are illustrated using exemplary graphical user interfaces. As an alternative, command line interfaces may also be used.

In the above exemplary embodiment of the invention, the computing environment 101 may be initiated in block 201, and then the test environment 106 may be initiated in block 204. In an alternative exemplary embodiment, the test environment 106 may be initiated, and then the computing environment 101 may be initiated. For example, the test environment 106 may be initiated first, and a test may be generated. The computing environment 101 may be initiated, and a desired test configuration 105 may be generated and imported into the test environment 106. Alternatively, the test environment 106 may initiate the computing environment 101 for defining a desired test configuration 105 to import.

Figure 7:
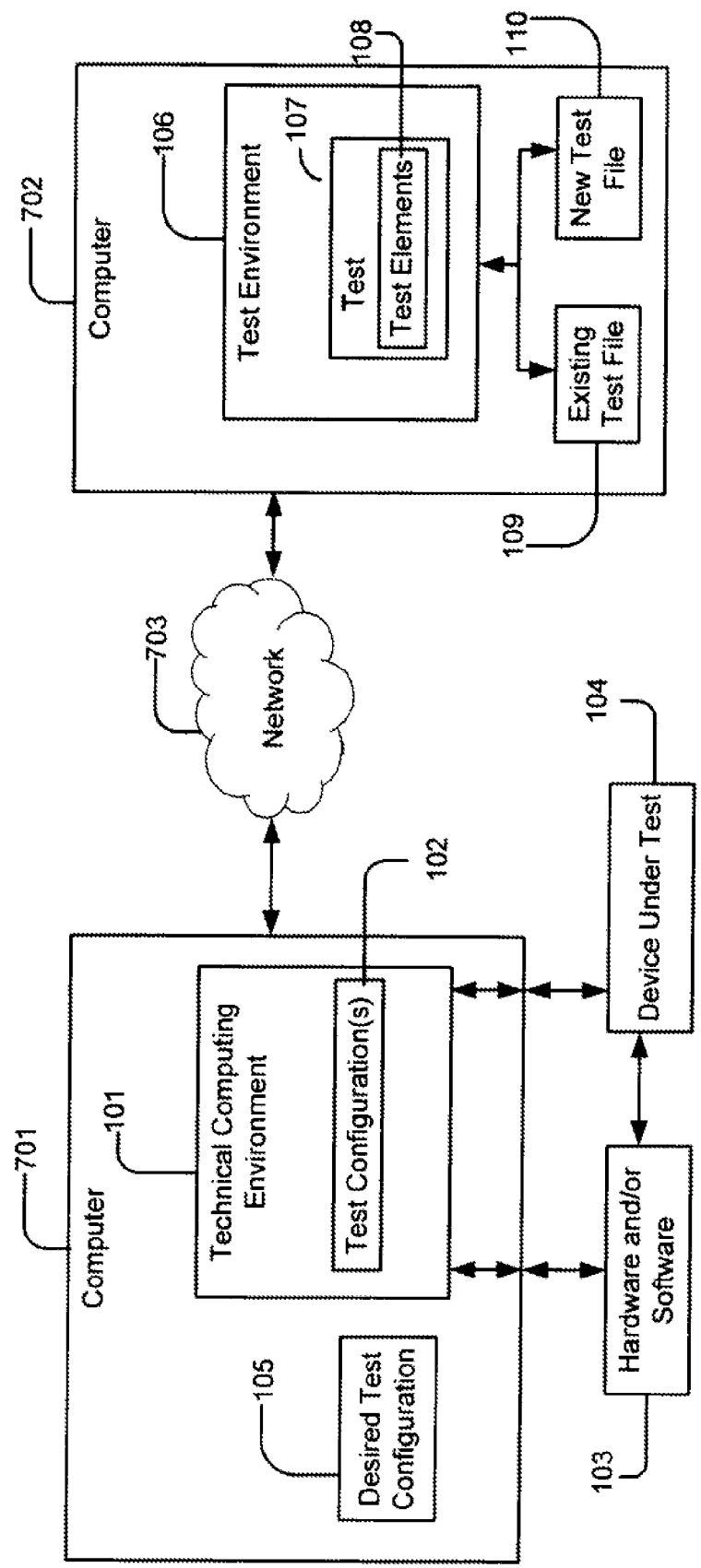
FIG. 7 illustrates another exemplary configuration for an exemplary embodiment of the invention.

In the above exemplary embodiment of the invention, the computing environment 101 and the test environment 106 may reside on the same computer 100. In an alternative exemplary embodiment, as illustrated in FIG. 7, the computing environment 101 and the test environment 106 may reside on different computers 701 and 702 connected via network 703. In this exemplary embodiment, in block 205, the desired test configuration 105 may be identified in the test environment 106 via a network address related to the computer 701 of the computing environment 101 (e.g., a file pathname on a local area network (LAN) for a computer-readable medium for the computer 701 of technical computing environment 101).

Figure 8:
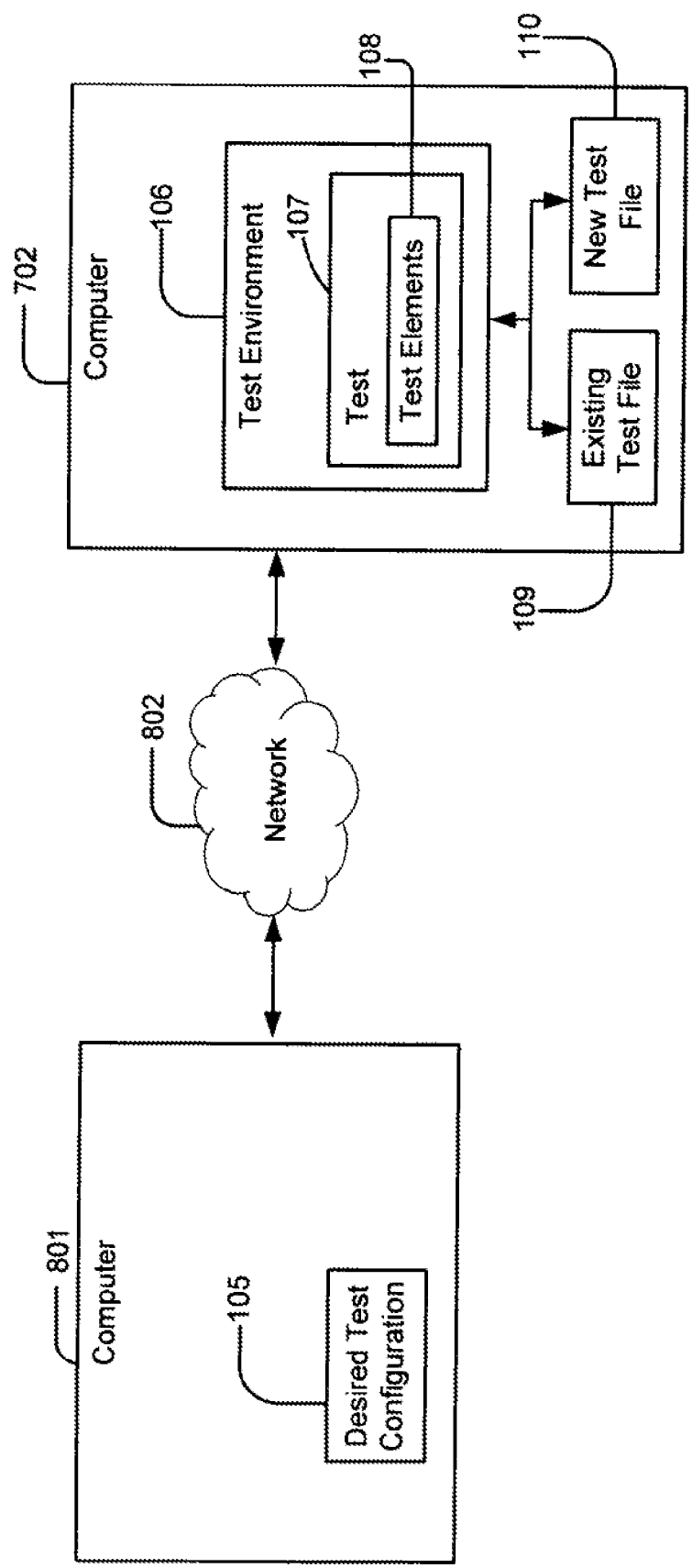
FIG. 8 illustrates yet another exemplary configuration for an exemplary embodiment of the invention.

In another alternative exemplary embodiment, as illustrated in FIG. 8, the desired test configuration 105 may be previously generated and available for download from a computer 801 via a network 802. The desired test configuration 105 may be stored on a computer-readable medium accessible via the network 802. For this exemplary embodiment, in block 205, the desired test configuration 105 may be identified in the test environment 106 via a network address related to the location of the desired test configuration 105 (e.g., a file pathname for a LAN-based computer-readable medium for the computer 801, or a uniform resource locator (URL) for access over the Internet to the computer 801).

Figure 9:
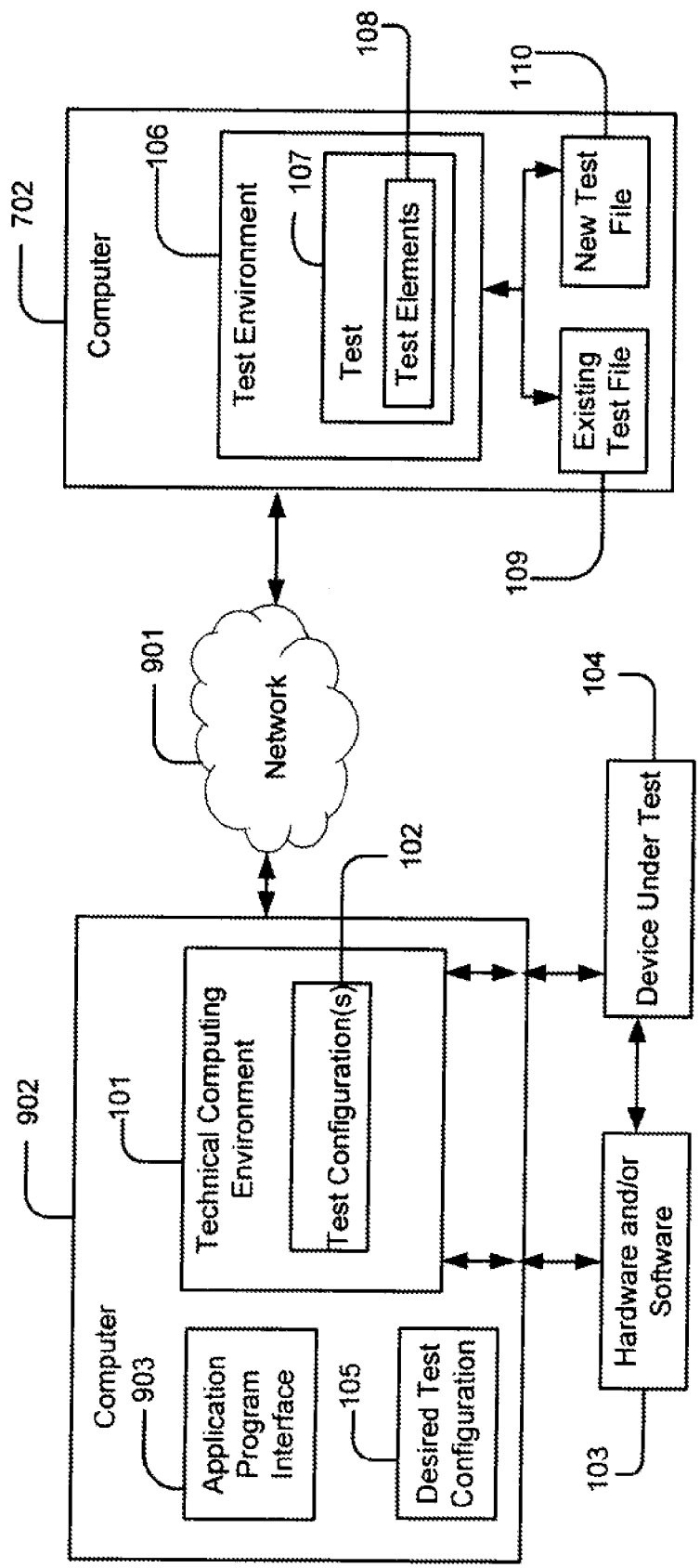
FIG. 9 illustrates yet another exemplary configuration for an exemplary embodiment of the invention.

In the above exemplary embodiment of the invention, the computing environment 101 may be used to generate the desired test configuration 105 during the design of the test in the test environment 106. The computing environment 101 and the test environment 106 may reside on the same computer. In an alternative exemplary embodiment, as illustrated in FIG. 9, the desired test configuration 105 may be generated in real time and transmitted or identified to the test environment 106 via a network 901. For this exemplary embodiment, the desired test configuration 105 may be identified in the test environment 106 by a test engineer via a network address relative to the location of the computing environment 101 and the computer 902 on which computing environment 101 resides (e.g., a uniform resource locator (URL) for access over the Internet to the computer 902). The network address may access a network-based computing environment 101. Via an application program interface (API) 903 provided for the network-based computing environment 101, a desired test configuration 105 may be generated in real time and imported into the test environment 106 via the network 901. As an example, the API 903 may permit the test configuration 102, defined in any third party computing environment 101, to be compatible with the test environment 106. By adhering to a defined API, the third-party may produce the test configuration 102 that may be invoked by the test environment 106.

Figure 10:
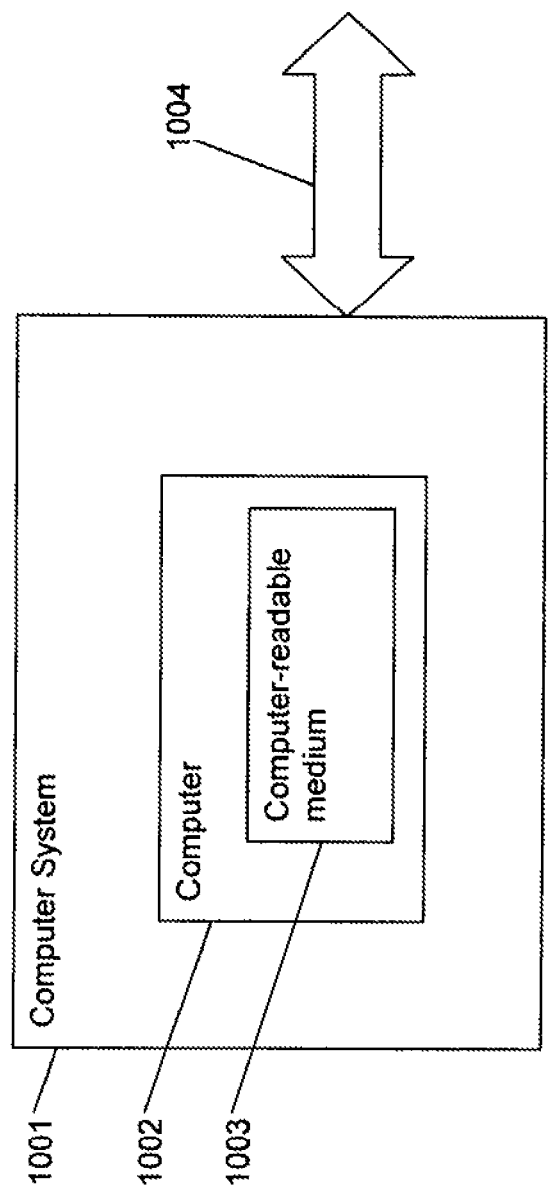
FIG. 10 depicts a computer system for use with the exemplary embodiments of the invention.

FIG. 10 depicts a computer system for use with exemplary embodiments of the present invention. The computer system 1001 may include one or more computers or computing units 1002 for implementing the invention. The computer 1002 may include a computer-readable medium 1003 embodying software for implementing the exemplary embodiments and/or software to operate the computer 1002 in accordance with the exemplary embodiments. As an option, the computer system 1001 may include a connection to a network 1004. With this option, the computer 1002 may be able to send and receive information (e.g., software, data, documents) from other computer systems via the network 1004. As discussed above, the computer 1002 may implement both the computing environment 101 and the test environment 106. In another exemplary embodiment, the computer 1002 may implement the computing environment 101, while another computer 1002, or a computer system, similar to the computer system 1001, may implement the test environment 106.

The exemplary embodiments may be embodied in many different ways as a software component or a combination of software and/or hardware components. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application. It may be embedded in custom or off-the shelf hardware, or may be implemented as a system on a chip or multiple chips.

Figure 11:
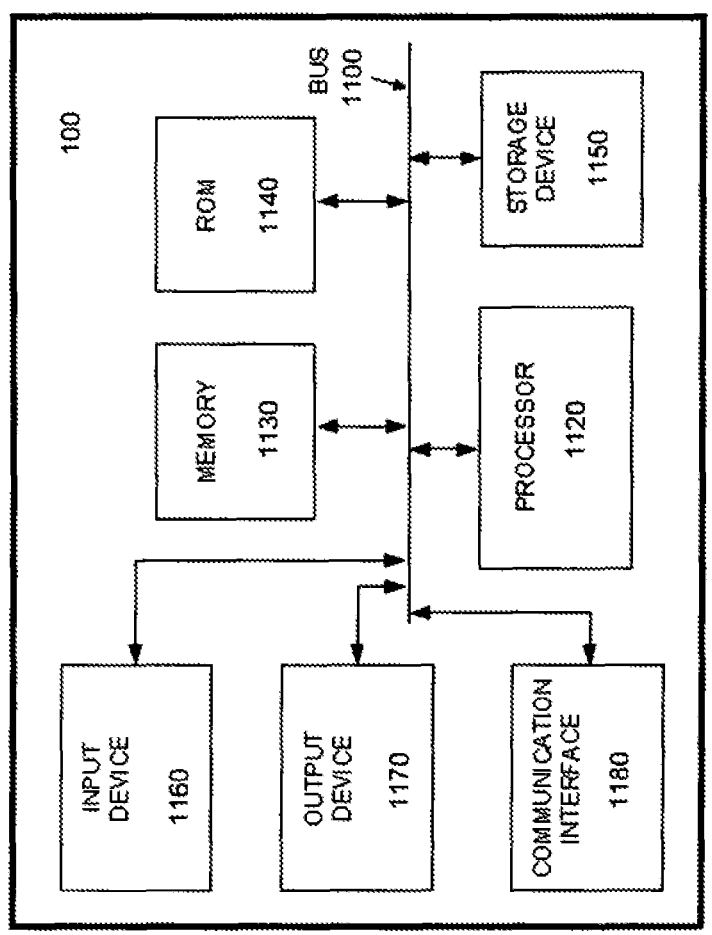
FIG. 11 depicts an exemplary architecture that may be used to implement the exemplary computer of FIG. 1.

FIG. 11 illustrates an exemplary architecture for implementing the computer 100 of FIG. 1. It will be appreciated that other devices that can be used with the computer 100, such as a client or a server, may be similarly configured. As illustrated in FIG. 11, the computer 100 may include a bus 1110, a processor 1120, a memory 1130, a read only memory (ROM) 1140, a storage device 1150, an input device 1160, an output device 1170, and a communication interface 1180.

Bus 1110 may include one or more interconnects that permit communication among the components of computer 100. Processor 1120 may include any type of processor, microprocessor, or processing logic that may interpret and execute instructions (e.g., a field programmable gate array (FPGA)). Processor 1120 may include a single device (e.g., a single core) and/or a group of devices (e.g., multi-core). Memory 1130 may include a random access memory (RAM) or another type of dynamic storage device that may store information and instructions for execution by processor 1120. Memory 1130 may also be used to store temporary variables or other intermediate information during execution of instructions by processor 1320.

ROM 1140 may include a ROM device and/or another type of static storage device that may store static information and instructions for processor 1120. Storage device 1150 may include a magnetic disk and/or optical disk and its corresponding drive for storing information and/or instructions. Storage device 1150 may include a single storage device or multiple storage devices, such as multiple storage devices operating in parallel. Moreover, storage device 1150 may reside locally on computer 100 and/or may be remote with respect to computer 100 and connected thereto via a network and/or another type of connection, such as a dedicated link or channel.

Input device 1160 may include any mechanism or combination of mechanisms that permit an operator to input information to computer 100, such as a keyboard, a mouse, a touch sensitive display device, a microphone, a pen-based pointing device, and/or a biometric input device, such as a voice recognition device and/or a finger print scanning device. Output device 1170 may include any mechanism or combination of mechanisms that outputs information to the operator, including a display, a printer, a speaker, etc.

Communication interface 1180 may include any transceiver-like mechanism that enables computer 100 to communicate with other devices and/or systems, such as a client, a server, a license manager, a vendor, etc. For example, communication interface 1180 may include one or more interfaces, such as a first interface coupled to a network and/or a second interface coupled to a license manager. Alternatively, communication interface 1180 may include other mechanisms (e.g., a wireless interface) for communicating via a network, such as a wireless network. In one implementation, communication interface 1180 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 100 may perform certain functions in response to processor 1120 executing software instructions included in a computer-readable medium, such as memory 1130. In alternative embodiments, hardwired circuitry may be used in place of or in combination with software instructions to implement features consistent with principles of the invention. Thus, implementations consistent with principles of the invention are not limited to any specific combination of hardware circuitry and software.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method comprising:
generating test configurations based on information regarding hardware or software, the test configurations directing at least one of setting up inputs for the test, measuring outputs for the test, or comparing the measured outputs with known criteria;
selecting a desired test configuration from the generated test configurations;
automatically generating, using a processor of the computer, test elements based on the desired test configuration, the test elements for testing at least one of the hardware or software, the generated test elements performing the testing by determining actions performed during the test;
generating a plurality of test vectors to test the hardware or software for the desired test configuration, the plurality of test vectors including one or more values for one or more parameters;
converting the desired test configuration to a script file, wherein the script file is written in an array-based language, a dynamically typed language, or any combination thereof;
automatically testing at least one of the hardware or software using the script file, wherein the testing includes:
performing, using a first set of one or more test vectors from the plurality of test vectors, a plurality of test iterations of one or more of the actions of one or more generated test elements, and
using at least a second set of one or more test vectors from the plurality of test vectors to determine the number of test iterations; and
producing a result based on the testing.

2. The computer-implemented method of claim 1, wherein the desired test configuration reads data from and writes data to the hardware or software.

3. The computer-implemented method of claim 1, wherein the hardware includes an instrument.

4. The computer-implemented method of claim 1, wherein the hardware includes a device under test.

5. The computer-implemented method of claim 1, wherein the software includes a data processing software.

6. The method of claim 1, further comprising:
encapsulating the desired test configuration in a machine readable software library.

7. The method of claim 1, further comprising:
generating a communication sequence for reading and writing data to the hardware or software, wherein the communication sequence selects the hardware or software to test, establishes a connection to the hardware or software, and applies the desired test configuration.

8. The method of claim 1, further comprising:
exporting data acquired from testing the hardware or software.

9. The method of claim 1, wherein the desired test configuration is automatically selected using the processor from the generated test configurations based on a predetermined criterion.

10. A method for testing comprising:
one of downloading software from the computer having the processor to another computer over a network or providing downloadable software from the computer having the processor to another computer over a network, which software when executed by the processor, causes the computer to perform operations comprising the method of claim 1.

11. A computer-implemented method comprising:
generating test configurations based on information regarding hardware or software;
selecting a desired test configuration from the generated test configurations;
automatically generating, using a processor of the computer, test elements based on the desired test configuration, at least one of the test elements for performing actions on at least one of the hardware or software;
generating a plurality of test vectors to test the hardware or software for the desired test configuration, the plurality of test vectors including one or more values for one or more parameters;

converting the desired test configuration to a script file, wherein the script file is written in an array-based language, a dynamically typed language, or any combination thereof;

automatically testing at least one of the hardware or software using the script file, wherein the testing includes:
performing, using a first set of one or more test vectors from the plurality of test vectors, a plurality of test iterations of one or more of the actions of one or more generated test elements, and
using at least a second set of one or more test vectors from the plurality of test vectors to determine the number of test iterations; and
producing a result based on the testing.

12. The computer-implemented method of claim 11, wherein the desired test configuration reads data from and writes data to the hardware or software.

13. The computer-implemented method of claim 11, wherein the hardware includes an instrument.

14. The computer-implemented method of claim 11, wherein the hardware includes a device under test.

15. The computer-implemented method of claim 11, wherein the software includes a data processing software.

16. The method of claim 11, further comprising:
encapsulating the desired test configuration in a machine readable software library.

17. The method of claim 11, further comprising:
generating a communication sequence for reading and writing data to the hardware or software, wherein the communication sequence selects the hardware or software to test, establishes a connection to the hardware or software, and applies the desired test configuration.

18. The method of claim 11, further comprising:
exporting data acquired from testing the hardware or software.

19. The method of claim 11, wherein the desired test configuration is automatically selected using the processor from the generated test configurations based on a predetermined criterion.

20. A method for testing comprising:
one of downloading software from the computer having the processor to another computer over a network or providing downloadable software from the computer having the processor to another computer over a network, which software when executed by the processor, causes the computer to perform operations comprising the method of claim 11.

21. A computer-implemented method comprising:
receiving a script file converted from a desired test configuration, wherein the script file is written in an array-based language, a dynamically typed language, or any combination thereof, and wherein the script file is converted from the desired test configuration by a processor that:
generates test configurations based on information regarding hardware or software, the test configurations directing at least one of setting up inputs for the test, measuring outputs for the test, or comparing the measured outputs with known criteria,
selects the desired test configuration from the generated test configurations,
automatically generates test elements based on the desired test configuration, the test elements for testing at least one of the hardware or software, the generated test elements determining actions performed during the test, and
generates a plurality of test vectors to test the hardware or software for the desired test configuration, the plurality of test vectors including one or more values for one or more parameters;
automatically testing at least one of the hardware or software using the script file, wherein the testing includes:
performing, using a first set of one or more test vectors from the plurality of test vectors, a plurality of test iterations of one or more of the actions of one or more generated test elements, and
using at least a second set of one or more test vectors from the plurality of test vectors to determine the number of test iterations; and
producing a result based on the testing.

22. The computer-implemented method of claim 21, further comprising:
reading data from and writing data to the hardware or software.

23. The computer-implemented method of claim 21, wherein the hardware includes an instrument.

24. The computer-implemented method of claim 21, wherein the hardware includes a device under test.

25. The computer-implemented method of claim 21, wherein the software includes a data processing software.

* * * * *

UNITED STATES PATENT AND TRADEMARK OFFICE
CERTIFICATE OF CORRECTION

PATENT NO.        : 8,819,493 B1
APPLICATION NO.   : 13/692492
DATED             : August 26, 2014
INVENTOR(S)       : Gaudette et al.

It is certified that error appears in the above-identified patent and that said Letters Patent is hereby corrected as shown below:

On the Title Page 1. item (71) Applicant: "The Mathworks, Inc., Natick, MA (US)" should be
   --The MathWorks, Inc., Natick, MA (US)--.

2. item (72) Inventors: "Michelle T. Hirsh" should be --Michelle T. Hirsch--.

Signed and Sealed this
Twenty-third Day of December, 2014

Michelle K. Lee
*Deputy Director of the United States Patent and Trademark Office*